United States Patent [19]

Wallace

[11] Patent Number: 4,789,487
[45] Date of Patent: Dec. 6, 1988

[54] SEPTIC TANK WITH INTEGRAL DIRECT DISTRIBUTION SYSTEM

[76] Inventor: Leland J. Wallace, Rte. 2, Box 293, Mount Olive, N.C. 28365

[21] Appl. No.: 106,223

[22] Filed: Oct. 8, 1987

[51] Int. Cl.$^4$ .............................................. B01D 21/24
[52] U.S. Cl. .................................... 210/747; 210/170; 210/532.2
[58] Field of Search ...................... 210/532.2, 747, 170, 210/188, 320, 539, 540, 608

[56] References Cited

U.S. PATENT DOCUMENTS

| | | | |
|---|---|---|---|
| 2,367,270 | 1/1945 | Evans et al. | 210/532.2 X |
| 2,852,140 | 9/1958 | MacLaren | 210/532.2 X |
| 2,857,054 | 10/1958 | Sitton | 210/532.2 |
| 3,051,315 | 8/1962 | Boester | 210/532.2 X |
| 3,545,617 | 12/1970 | Hamrick | 210/532.2 X |
| 4,298,470 | 11/1981 | Stallings | 210/532.2 X |
| 4,614,584 | 9/1986 | DiDuca | 210/532.2 X |

Primary Examiner—Tom Wyse
Attorney, Agent, or Firm—Rhodes, Coats & Bennett

[57] ABSTRACT

The present invention entails a septic tank having an internal and integral distribution system formed therein for directly directing waste material from the tank without requiring the waste material to pass into and through a distribution box. The septic tank includes a distribution wall with a series of outlet ports that connect to a series of drain lines that extend throughout a drain field. A distribution baffle is secured closely adjacent the distribution wall and effectively controls the flow of waste material from the containing section of the septic tank to the distribution area that is defined between the distribution wall and distribution baffle.

8 Claims, 2 Drawing Sheets

SEPTIC TANK WITH INTEGRAL DIRECT DISTRIBUTION SYSTEM

FIELD OF INVENTION

The present invention relates to septic tanks and waste containing and management systems, and more particularly to a septic tank and septic tank system that includes an integral distribution area that permits for the direct channeling of waste material from the septic tank structure to the drain field.

BACKGROUND OF THE INVENTION

Typically a septic tank system includes a main septic tank for containing waste material, a distribution box communicatively connected to the outlet side of the septic tank, and a series of drain lines that lead from the distribution box. The addition of the distribution box is expensive and it is quite laborous and time consuming to install and properly adjust the distribution box. In addition, there is plumbing and material costs for making the interconnection between the septic tank and distribution box. In addition, it is not uncommon for the distribution box to be easily upset and moved out of its correct position during the back filling operation.

But one of the major disadvantages and drawbacks of such conventional septic tank systems is found in the plumbing and line interconnection that exists between the septic tank and the distribution box. This is typically comprised of a small pipe tee and a small pipe. It is not uncommon for this plumbing to become clogged which results in the total septic tank system failing. In these cases, it becomes quite time consuming and expensive to correct such a clogging problem.

Therefore, there has been and continues to be a need for a more efficient and effective septic tank system.

SUMMARY AND OBJECTS OF THE INVENTION

The present invention entails a septic tank structure that includes an integral distribution area or section that enables the septic tank to directly channel waste material from the septic tank into and through an adjacent drain field.

The septic tank structure of the present invention include inlet and outlet sections with the outlet section including a distribution wall having a series of outlet ports. A distribution baffle is disposed adjacent to distribution wall and serves to control the flow of sewage material from the containing section of the septic tank into the distribution area defined between the distribution wall and the distribution baffle. Effectively, the position and orientation of the distribution baffle with respect to the distribution wall prevents floating solid material from existing the septic tank while allowing relatively pure liquid from an intermediate zone of the containing area of the tank to be directed out the outlet ports and directly from the septic tank through drain lines extending through an adjacent drain field.

Therefore, it is an object of the present invention to provide a septic tank system that eliminates the need for a separate distribution box.

Another object of the present invention resides in the provision of a septic tank system that provides for the direct discharge of waste material from the septic tank into and through the drain field.

Another object of the present invention resides in the provision of a septic tank system that is relatively inexpensive and which is effective and efficient in operation.

Another object of the present invention resides in the provision of a septic tank structure that is easy to install and which is designed to be relatively maintenance free.

Other objects and advantages of the present invention will become apparent and obvious from a study of the following description and the accompanying drawings which are merely illustrative of such invention.

Figure 1:
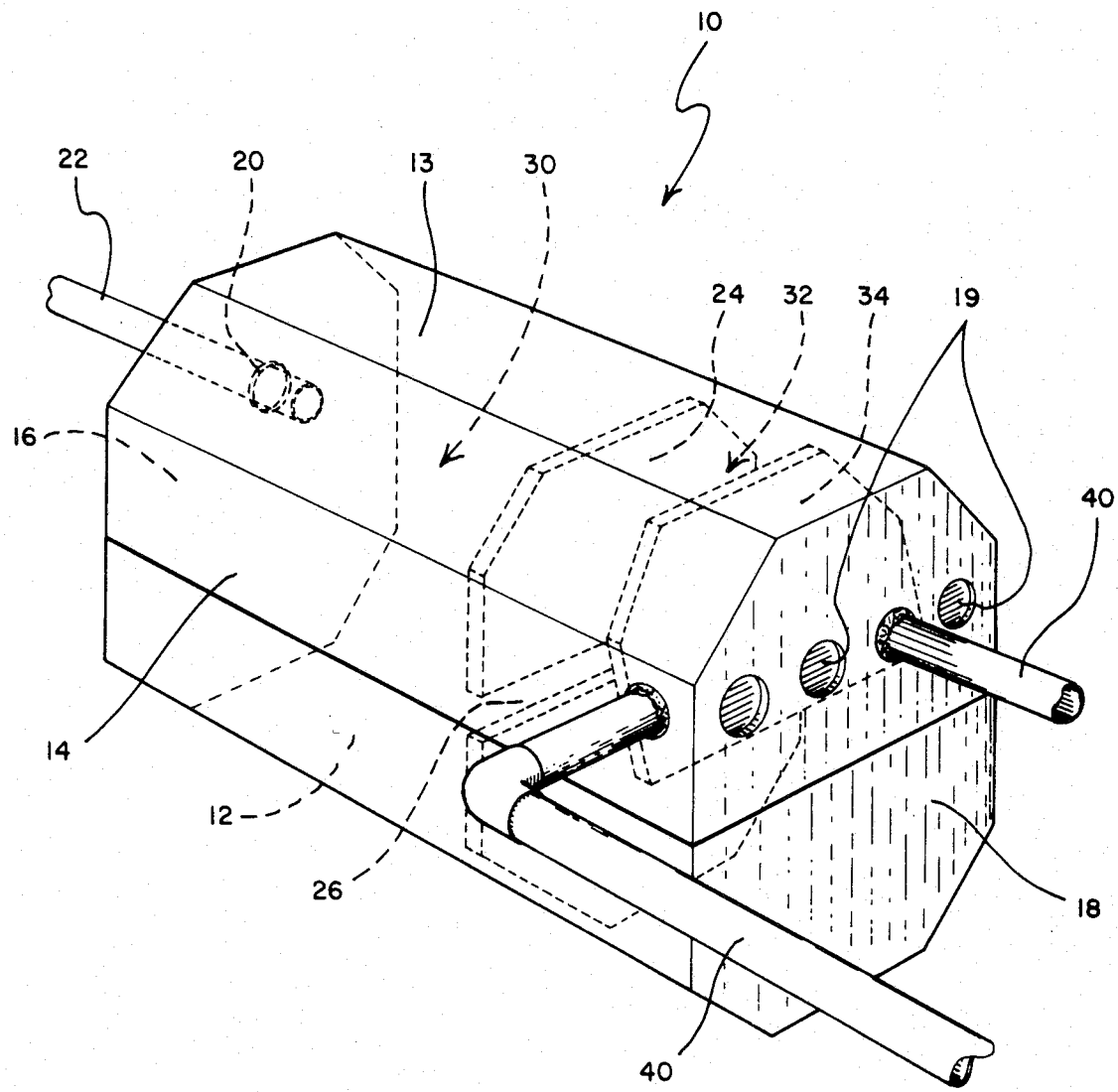
FIG. 1 is a perspective view of the septic tank structure of the present invention.

With further reference to the drawings, the septic tank structure of the present invention is shown therein and indicated generally by the numeral 10. Viewing septic tank structure 10 in more detail it is seen that the same comprises upper and lower mating sections that are typically constructed of concrete or other suitable material. With the sections mated together, the sectic tank 10 includes a bottom 12, top 13, and a side wall structure 14. Secured about one end is an inlet end 16 and disposed about the opposite end is a distribution end or a distribution wall 18. A series of outlet ports 19 are formed in the distribution wall 18 which include in the case of the present disclosure adjacent portions of the side wall structure 14.

An inlet opening 20 is formed in inlet end 16. An inlet line 22 is communicatively connected to inlet opening 20 and serves to direct waste material into the septic tank structure.

Disposed intermediately within septic tank 10 is a main intermediate baffled 24. Baffled 24 includes an opening 26 and a top vent 28. Intermediate baffle 24 divides septic tank 10 into an inlet section indicated generally by numeral 30 and an outlet section indicated generally by the numeral 32.

Figure 2:
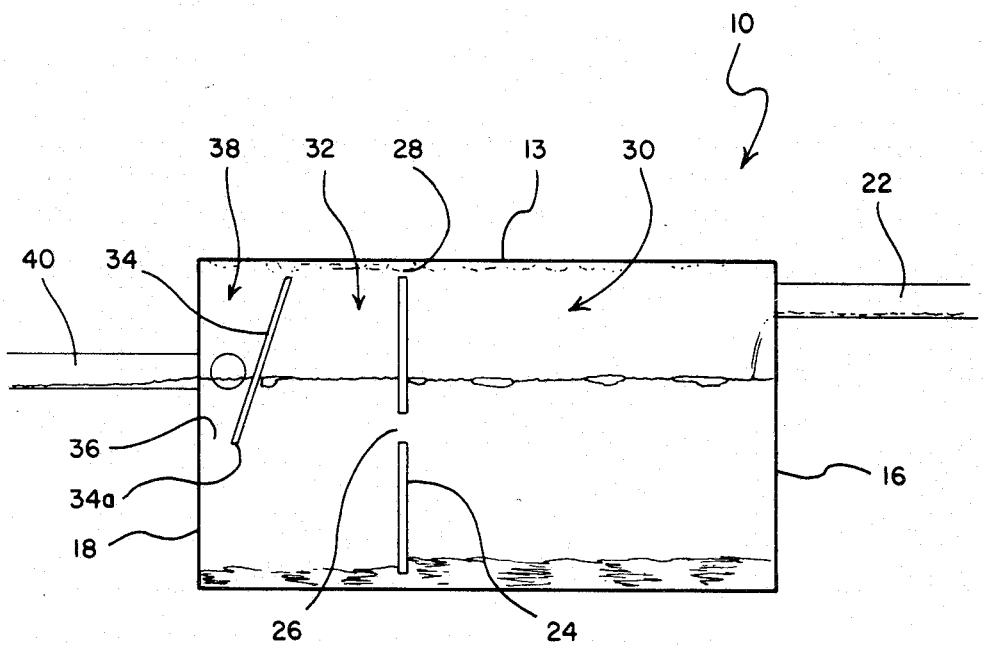
FIG. 2 is a side-sectional view of the septic tank structure of the present invention illustrating the containment of waste material and water therein.
Figure 3:
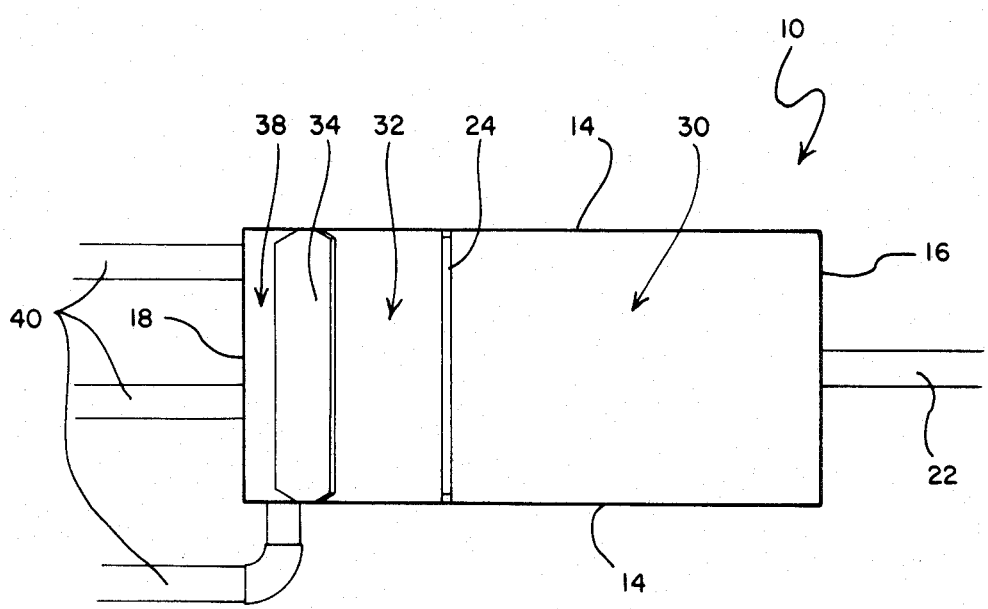
FIG. 3 is a top plane view of the septic tank structure of the present invention with the top removed to better illustrate the structure of the tank.

Secured adjacent distribution wall 18 is an inclined or angled distribution baffle 34. Note distribution baffle 34 includes a lower terminal edge 34a that terminates at a level below the outlet ports 19. A distribution section 38 is formed and defined between the distribution baffle 34 and the distribution wall 18. The area between the distribution baffle 34 and the inlet wall 16 is sometimes referred to as the containing area or section of the tank 10. Note that the distribution baffle 34 includes a top air vent opening (FIG. 2).

A series of drain lines 40 are communicatively connected to selected outlet ports 19 and extend through a drain field in conventional fashion. The number of drain lines may be selected and will depend on a particular application. Respective outlet ports 19 would include knockouts that would effectively close and block unused outlet ports.

In use, septic tank 10 is designed to hold and contain waste material. As indicated and shown in FIG. 2, note that the waste material contained within the tank 10 includes an upper surface level and wherein there is some solid material floating thereabout. Disposed about the bottom of the tank 10 is a layer of sediment. Between the sediment and upper surface level there is an intermediate zone of liquid that would ordinarily be relatively pure or clean. This intermediate zone of relatively pure liquid would extend about a level generally coinciding with opening 26 in the intermediate baffle 24.

Consequently, the area of the septic tank from the distribution baffle 34 towards the inlet wall 16 would be referred to as the containing section of the septic tank. Note that the distribution baffle 34 is angled such that the lower terminal edge terminates in relatively close proximity to the distribution wall 18. Also, note that the lower edge 34a of distribution baffle 34 extends through the upper surface level of the waste material and therefore, the distribution baffle generally prohibits floating solid material from pssing the distribution baffle and entering the distribution area 38.

Consequently, it is appreciated that the septic tank system of the present invention permits the relatively pure or cleam liquid to pass through opening 36 formed between distribution wall 18 and the lower terminal edge 34a of distribution baffle 34. Liquid contained in this section is directed out the respective drain lines 40 into and through the adjacent drain field.

From the foregoing specification and discussion it is appreciated that the septic tank structure and system of the present invention obviates the necessity for a distribution box. Thus, as the waste material becomes pure or becomes disposed in the intermediate zone then it can be channeled directly from the septic tank 10 into the drain field via drain lines 40.

What is claimed is:

1. A single tank septic system having an integral distribution section with a plurality of outlet lines that obviates the requirements of a distribution box comprising: a single tank structure having a bottom, side wall structure, and a top that forms an enclosure therein with the tank being adapted to contain a waste solution having an upper surface level and typically including an intermediate zone of relatively pure liquid and some solid waste material floating about the upper surface; a central baffle disposed within the enclosure that divides the enclosure into two sections, an inlet section and an outlet section; inlet means formed in the inlet section for directing waste into the tank; an integral sewage distribution sub-system formed in the outlet section of the tank and including a distribution baffle extending downwardly from the top of the tank and through the surface level of liquid typically contained within the tank with the baffle being angled towards a distribution wall forming a part of the wall structure of the tank, and wherein the lower end of the baffle terminates relatively close to the distribution wall and forms a distribution opening therebetween that allows liquid from the intermediate zone to pass therebetween; a series of outlet ports formed in the distribution wall at a level above the lower terminal edge of the distribution baffle; said distribution baffle and the distribution wall forming a distribution area within the septic tank itself as the distribution baffle prevents solid waste material from reaching the outlet ports but allows relatively pure liquid from the intermediate zone to pass between the distribution baffle and the distribution wall into the formed distribution area; said distribution wall and distribution area having a plurality of outlet ports spaced about the distribution wall and wherein selected outlet ports are each connected to a drain line which extends outwardly therefrom through a drain field for distributing liquid directly from the tank structure into the drain field.

2. The septic tank system of claim 1 wherein there is provided vent means in the upper portion of the distribution baffle.

3. The septic tank system of claim 1 wherein the septic tank is an elongated structure and wherein the distribution wall includes an end portion of the tank structure.

4. The septic tank system of claim 1 wherein the septic tank structure comprises upper and lower mating sections and wherein the distribution baffle is secured interiorly of the upper section and depends downwardly therefrom at an angle.

5. The septic tank system of claim 1 wherein said outlet ports have knockout walls covering said outlet ports; and wherein said knockout walls prevent waste solution from passing through said outlet ports can be removed to allow the passage of waste solution through respective outlet ports.

6. A septic tank with an integral direct distribution section that obviates the necessity for a separate distribution box comprising: a tank structure forming an enclosure with an intermediate main baffle disposed therein that divides the enclosure into inlet and outlet sections; the outlet section including a distribution wall having a series of generally horizontally spaced outlet ports formed therein; a distribution baffle disposed within the outlet section of the tank and having a lower terminal edge disposed below the level of the outlet ports and spaced relatively close to the distribution wall and wherein the distribution baffle extends upwardly therefrom towards the top of the septic tank so as to form a relatively small distribution area within the distribution section, and wherein the distribution baffle isolates floating solid waste material from the distribution area but yet allows fluid within the tank to pass between the lower edge of the distribution baffle and the distribution wall; and said distribution wall and distribution area having a plurality of outlet ports spaced about the distribution wall and wherein selected outlet ports are each connected to a drain line which extends outwardly therefrom through a drain field for distributing liquid directly from the tank structure into the drain field.

7. The septic tank system of claim 6 wherein said outlet ports have knockout walls covering said outlet ports; and wherein said knockout walls prevent waste solution from passing through said outlet ports can be removed to allow the passage of waste solution through respective outlet ports.

8. A method of containerizing and disposing of sewage comprising the steps of: directing waste material into a septic tank; forming a series of horizontally spaced outlet ports in a distribution wall forming a part of the septic tank; providing a distribution baffle adjacent said distribution wall and extending the lower terminal edge thereof to a level below the outlet ports so as to form a distribution area between the distribution baffle and the distribution wall; blocking floating solid material from passing the distribution baffle to the distribution area and then directing that material out the outlet ports; and directly channeling waste material from the distribution area of the septic tank into a drain field by channeling the waste material through a series of drain lines extending from the series of outlet ports in the septic tank, thereby eliminating the need and expense of a separate distribution box.

* * * * *